United States Patent
Jenkins et al.

(10) Patent No.: US 10,145,761 B1
(45) Date of Patent: Dec. 4, 2018

(54) INTERNAL ARRANGEMENT AND MOUNT OF SOUND COLLECTING SENSORS IN EQUIPMENT SOUND MONITORING SYSTEM

(71) Applicant: Discovery Sound Technology, LLC, Nashville, TN (US)

(72) Inventors: John Jenkins, Nashville, TN (US); Mike Stumpf, Nashville, TN (US)

(73) Assignee: Discovery Sound Technology, LLC, Nashville, TN (US)

( * ) Notice: Subject to any disclaimer, the term of this patent is extended or adjusted under 35 U.S.C. 154(b) by 9 days.

(21) Appl. No.: 15/645,611

(22) Filed: Jul. 10, 2017

Related U.S. Application Data

(63) Continuation-in-part of application No. 14/918,201, filed on Oct. 20, 2015, now Pat. No. 9,971,667, which
(Continued)

(51) Int. Cl.
*G06F 17/00* (2006.01)
*G01M 99/00* (2011.01)
(Continued)

(52) U.S. Cl.
CPC ......... *G01M 99/008* (2013.01); *G08B 21/185* (2013.01); *G06F 17/30864* (2013.01); *G06Q 10/20* (2013.01)

(58) Field of Classification Search
CPC .. G06F 11/07; G06F 11/0751; G06F 11/3058; G06F 11/3072; G06F 11/3089;
(Continued)

(56) References Cited

U.S. PATENT DOCUMENTS

| 4,287,581 A | 9/1981 | Neale, Sr. |
| 4,530,240 A * | 7/1985 | Board ................. G01N 29/12 |
| | | 73/593 |

(Continued)

FOREIGN PATENT DOCUMENTS

WO    2012088707 A1    7/2012

OTHER PUBLICATIONS

N Tandon et al: "The Application of the Sound-Intensity Technique to Defect Detection in Roiling-Element Bearings", Applied Acoustics, Jan. 1, 1990 (Jan. 1, 1990), pp. 207-217, XP55402079, Retrieved from the Internet: URL:http://ac.els-cdn.com/0003682X9090019Q/1-s2.0-0003682XZ9090019Q-main.pdf?_tid=87d73c40-8cbd-11e7-a5d5-00000aacb35d&acdnat=1504013311_133ffbe3b260c5133178e57112c311c8.
(Continued)

*Primary Examiner* — Andrew C Flanders
(74) *Attorney, Agent, or Firm* — Patterson Intellectual Property Law, P.C.; Gary L. Montle

(57) ABSTRACT

A system and method are provided for equipment sound monitoring. The system includes an electromechanical device having at least one cavity defined therein. A dampening tube is such that at least a portion of the dampening tube is received within the at least one cavity without contacting a surface of the electromechanical device. A transducer box includes an opening defined therein, the opening configured to receive at least a portion of the dampening tube. The transducer box further includes a sound detection module configured to detect at least one of audio and vibration associated with the electromechanical device. A method of connecting and using the equipment sound monitoring system are provided.

20 Claims, 13 Drawing Sheets

Related U.S. Application Data is a continuation-in-part of application No. 13/690,912, filed on Nov. 30, 2012, now Pat. No. 9,223,299.

(60) Provisional application No. 62/065,980, filed on Oct. 20, 2014.

(51) Int. Cl.
  *G08B 21/18* (2006.01)
  *G06Q 10/00* (2012.01)
  *G06F 17/30* (2006.01)

(58) Field of Classification Search
  CPC .... G01M 1/22; G01M 13/028; G01M 13/045; G01M 99/008; H04R 29/00
  See application file for complete search history.

(56) References Cited

U.S. PATENT DOCUMENTS

| | | | |
|---|---|---|---|
| 4,658,245 A | 4/1987 | Dye et al. | |
| 4,987,769 A | 1/1991 | Peacock et al. | |
| 5,103,675 A | 4/1992 | Komninos | |
| 5,432,755 A | 7/1995 | Komninos | |
| 5,433,207 A * | 7/1995 | Pretlow, III | A61B 8/481 600/458 |
| 5,436,556 A | 7/1995 | Komninos | |
| 5,445,026 A | 8/1995 | Eagan | |
| 5,485,391 A * | 1/1996 | Lindstrom | G05B 19/4065 700/175 |
| 5,710,377 A | 1/1998 | Youngquist et al. | |
| 5,854,422 A | 12/1998 | McKeon et al. | |
| 5,955,670 A | 9/1999 | Goodman et al. | |
| 6,057,959 A | 5/2000 | Taylor et al. | |
| 6,058,076 A | 5/2000 | Komninos | |
| 6,079,275 A | 6/2000 | Komninos | |
| 6,163,504 A | 12/2000 | Komninos et al. | |
| 6,175,934 B1 | 1/2001 | Hershey et al. | |
| 6,200,098 B1 | 3/2001 | Kennedy et al. | |
| 6,247,353 B1 | 6/2001 | Battenberg et al. | |
| 6,295,510 B1 | 9/2001 | Discenzo | |
| 6,301,514 B1 | 10/2001 | Canada et al. | |
| 6,658,373 B2 | 12/2003 | Rossi et al. | |
| 6,666,093 B2 | 12/2003 | Morganti | |
| 6,701,725 B2 | 3/2004 | Rossi et al. | |
| 6,766,692 B1 | 7/2004 | Eagan | |
| 6,775,576 B2 | 8/2004 | Spriggs et al. | |
| 6,809,642 B1 | 10/2004 | Brenner | |
| 6,923,063 B2 | 8/2005 | Komninos | |
| 6,973,793 B2 | 12/2005 | Douglas et al. | |
| 6,978,675 B2 | 12/2005 | Eagan | |
| 7,016,742 B2 | 3/2006 | Jarrell et al. | |
| 7,051,577 B2 | 5/2006 | Komninos | |
| 7,079,967 B2 | 7/2006 | Rossi et al. | |
| 7,099,852 B2 | 8/2006 | Unsworth et al. | |
| 7,308,385 B2 | 12/2007 | Wegerich et al. | |
| 7,540,183 B2 | 6/2009 | Komninos | |
| 7,580,781 B2 | 8/2009 | Mindeman | |
| 7,603,586 B1 | 10/2009 | Skladanowski et al. | |
| 8,024,938 B2 | 9/2011 | Rossi et al. | |
| 8,245,576 B2 | 8/2012 | Komninos | |
| 8,468,874 B2 | 6/2013 | Komninos | |
| 8,495,914 B2 | 7/2013 | Izikoff | |
| 8,872,652 B2 | 10/2014 | Komninos | |
| 8,872,654 B2 | 10/2014 | Komninos | |
| 2001/0045125 A1* | 11/2001 | Alexander | G01M 17/025 73/146 |
| 2002/0152056 A1 | 10/2002 | Herzog et al. | |
| 2004/0102928 A1 | 5/2004 | Cuddihy et al. | |
| 2004/0158474 A1 | 8/2004 | Karschnia et al. | |
| 2005/0006985 A1* | 1/2005 | Nguyen | G01F 1/662 310/326 |
| 2005/0096873 A1 | 5/2005 | Klein | |
| 2005/0126264 A1 | 6/2005 | Komninos | |
| 2006/0053867 A1 | 3/2006 | Stumpf | |
| 2006/0135907 A1 | 6/2006 | Remde et al. | |
| 2006/0164097 A1 | 7/2006 | Zhou et al. | |
| 2006/0265261 A1 | 11/2006 | Wetzer et al. | |
| 2007/0028693 A1 | 2/2007 | Komninos | |
| 2007/0109137 A1 | 5/2007 | Farrel | |
| 2007/0109138 A1 | 5/2007 | Farrell | |
| 2007/0112528 A1 | 5/2007 | Farrell | |
| 2008/0147356 A1 | 6/2008 | Leard et al. | |
| 2009/0196431 A1 | 8/2009 | Gregg | |
| 2010/0039271 A1 | 2/2010 | Izikoff et al. | |
| 2010/0067708 A1 | 3/2010 | Groth | |
| 2010/0097057 A1 | 4/2010 | Karpen | |
| 2010/0307860 A1 | 12/2010 | Ellingson | |
| 2011/0022346 A1 | 1/2011 | Rossi et al. | |
| 2011/0023585 A1 | 2/2011 | Izikoff | |
| 2011/0055669 A1 | 3/2011 | DeHaan et al. | |
| 2011/0074589 A1 | 3/2011 | Han et al. | |
| 2011/0246102 A1* | 10/2011 | Bellin | G01N 3/44 702/56 |
| 2011/0286304 A1* | 11/2011 | Thigpen | G01N 3/44 367/25 |
| 2012/0035802 A1 | 2/2012 | Suzuki et al. | |
| 2012/0230482 A1 | 9/2012 | Gavillet | |
| 2013/0019686 A1* | 1/2013 | Oliver | B61K 9/12 73/622 |
| 2013/0063262 A1 | 3/2013 | Shaikh et al. | |
| 2013/0283890 A1 | 10/2013 | Komninos | |
| 2014/0114612 A1 | 4/2014 | Yoskovitz et al. | |

OTHER PUBLICATIONS

Rutter, Thomas A.: "Acoustic Analysis of Quiet Ball Bearing Failure Modes", Marine Technology, Apr. 1, 1979 (Apr. 1, 1979), pp. 181-188, XP5402240, Retrieved from the Internet: URL:http://www.sname.org/HigherLogic/System/DownloadDocumentFile.ashx?DocumentFileKey-d48eeb1c-6a0a-4083-b282-aa79ea0f0679 [retrieved on Aug. 30, 2017].

European Patent Office: Extended European Search Report re: Application No. 13858103.8, dated Jul. 5, 2016.

Ivan Polajnar et al: Sources of Acoustic Emission in Resistance Spot Welding, Nov. 6, 2008 (Nov. 6, 2008), XP055283415, Retrieved from the Internet: URL:http://citeseerx.ist.psu.edu/viewdoc/download?doi=-10.1.1.216.5231&rep=rep1&type=pdf [retrieved Jun. 24, 2016].

Emielniak et al: "Catastrophic Tool Failure Detection Based on Acoustic Emission Signal Analysis", CIRP Annals, Elsevier BV, NL, CH, FR, vol. 47, No. 1, Jan. 1, 1998 (Jan. 1, 1998), pp. 31-34, XP022137426, ISSN: 0007-08506 (07) 62779-6.

Anonymous: "Outlier—=Wikipedia, the free encyclopedia", Nov. 8, 2012 (Nov. 8, 2012), XP055283665, Retrieved from the Internet: URL: https://en.wikipedia.org/w/index.php?title=Outlier&oldid=-521929459 [retrieved Jun. 27, 2016].

D. Rajendra et al: "A physically based classification approach for identifying AE source mechanism", Optical Sensing II, vol. 7648, Mar. 25, 2010 (Mar. 25, 2010), p. 76480Y, XP55283442, 1000 20th St. Bellingham WA 98225-6705 USA ISSN: 0277-786X, DOI: 10,.1117/12.847781 ISBN: 978-1-62841-971-9 *abstract*.

* cited by examiner

INTERNAL ARRANGEMENT AND MOUNT OF SOUND COLLECTING SENSORS IN EQUIPMENT SOUND MONITORING SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation-in-part of U.S. patent application Ser. No. 14/918,201, filed Oct. 20, 2015, which claims priority from U.S. Provisional Patent Application No. 62/065,980, filed Oct. 20, 2014. U.S. patent application Ser. No. 14/918,201 is also a continuation-in-part of U.S. patent application Ser. No. 13/690,912 (now U.S. Pat. No. 9,223,299), filed Nov. 30, 2012, each of which is hereby incorporated by reference in its entirety.

BACKGROUND OF THE INVENTION

The present invention relates generally to the field of utilizing ultrasound emissions for fault detection in industrial equipment. More particularly, the present invention relates to a system and method for locally collecting sound data from distributed industrial equipment and remotely and centrally diagnosing the sound data for a wide array of industrial equipment to determine the presence of faults and trends to failure that may be used as the basis for corrective action/preventative maintenance programs.

Oftentimes, it may be difficult to obtain readings in tight spaces or other areas where externally mounted sound collecting sensors, such as transducers, and vibration dampening housings are not possible. Furthermore, there are certain areas where technicians cannot access due to safety, compliance, or economic concerns. What is needed is a solution whereby equipment sound detection may be implemented even in tight areas and where traditional sound detection is not possible.

BRIEF SUMMARY OF THE INVENTION

Systems and methods in accordance with the present disclosure are capable of collecting at least sound data files from equipment across a number of distributed locations and properties, and leverage the collected data and aggregated variables derived therefrom to perform comparative analysis and recommend corrective action as needed. Implementations consistent with the present disclosure may permit new ways to gather sound intensity and signature beyond methods where a technician positions a transducer using a sound cup at a particular distance and angle, and where a transducer and vibration dampening housing are attached externally to a position relative to the sound cup, distance, and angle. Aspects of the present disclosure may prevent contact vibration effects on a transducer and thus ensure the highest clarity of a non-contact sound signature and intensity. Implementations consistent with the present disclosure permit electromechanical device manufacturers to design for and/or include sensors into products at the manufacturing stage. Additional inspection points may be added which were not previously available through mobile or externally-mounted means. Implementations consistent with the present disclosure may allow for additional data integration from other sources of gathered data and may provide a simple and cost-effective means to permanently or semi-permanently mount one or more sensors.

In an embodiment of a system disclosed herein for a system for equipment sound monitoring, the system includes an electromechanical device having at least one cavity defined therein. A dampening tube is such that at least a portion of the dampening tube is received within the at least one cavity without contacting a surface of the electromechanical device. A transducer box includes an opening defined therein, the opening configured to receive at least a portion of the dampening tube. The transducer box further includes a sound detection module configured to detect at least one of audio and vibration associated with the electromechanical device.

In another aspect of the embodiment, the system further includes a server connected to the transducer box via a communications network. The transducer box further includes a communications interface coupled to the communications network. The transducer box may be configured to transmit one or more sets of data from the sound detection module to the server via the communications network. The communications network may be a Bluetooth communications network, a local area network (LAN), and/or the Internet.

In a further aspect of the embodiment, the server is configured to receive the one or more sets of data, to determine baseline criteria according to one or more of an electromechanical device type, location, and sound data, wherein one or more comparative models of baseline data are associated with at least one status of operation of the electromechanical device, to compare the received one or more sets of data with the baseline data, to identify variations between the one or more sets of data and the baseline data associated with failure or substandard operation of the electromechanical device, and to generate an alert configured to notify a user of the failure or substandard operation of the electromechanical device.

In another aspect of the present disclosure, a method for providing equipment sound monitoring for an electromechanical device is provided. The method begins by creating a cavity within a housing of the electromechanical device. At least a portion of a dampening tube is inserted into the cavity without causing contact between the dampening tube and the housing. A transducer box is anchored to the housing. At least a portion of the dampening tube is placed into the transducer box. Analog sound signals associated with the electromechanical device are measured by one or more transducers of the transducer box.

In another aspect of this embodiment, the collected sound signals are converted into digital sound data. One or more data files comprising location data, electromechanical device type data, and the digital sound data are transmitted to a server via a communications network. Baseline criteria are determined according to one or more of the electromechanical device type, location data, and sound data, one or more comparative models of baseline data associated with at least one status of operation of the electromechanical device. The received digital sound data is compared with the baseline data and variations between the collected digital sound data and the baseline data associated with failure or substandard operation of the electromechanical device are determined. An alert configured to notify a user of the failure or substandard operation of the electromechanical device is generated.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
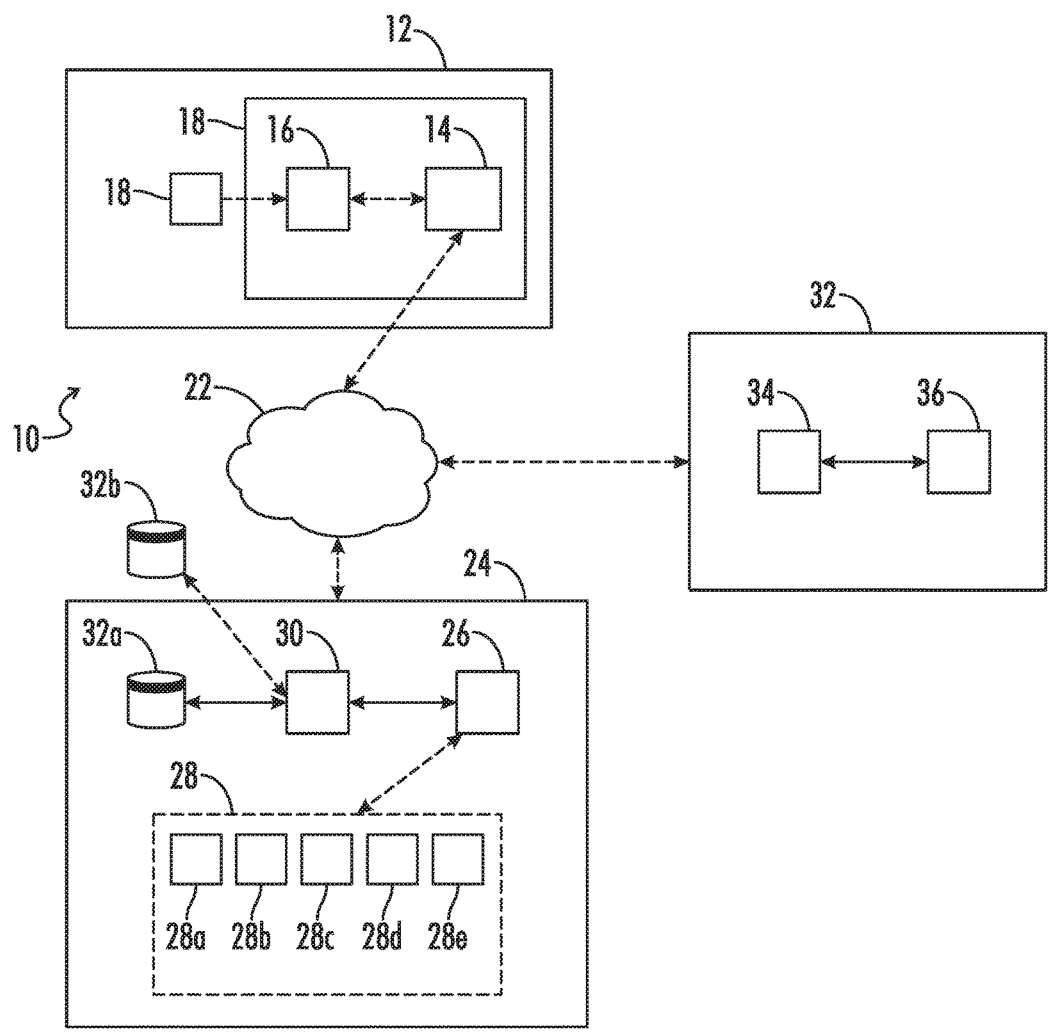
FIG. 1 is a block diagram representing an exemplary embodiment of a system for comparative analysis of sound data according to the present disclosure.

Referring generally to FIGS. 1-12, various exemplary embodiments may be described herein for a system and method for remotely collecting sound data and diagnosing issues in respective industrial equipment. Where the various figures may describe embodiments sharing various common elements and features with other embodiments, similar elements and features are given the same reference numerals and redundant description thereof may be omitted below.

Referring more particularly to FIG. 1, an embodiment of a system 10 according to the present disclosure includes an electromechanical device 12 to which a sound detection device 14 is operatively connected. The sound detection device may comprise a transducer 16 effective to periodically or continuously receive at least analog sound signals from the electromechanical device and convert said signals into digital sound data. The sound detection device may further be effective to generate one or more digital data files based upon the received sound signals, predefined parameters, or other variable inputs, such that the digital data files comprise the digital sound data, the type of electromechanical device 12 to which the sound detection device 14 is operatively connected, and the location of the electromechanical device 12 or sound detection device 14.

The term "electromechanical device" as used herein is not limited in scope with respect to a particular field of use, but generally refers within the scope of the present invention to electrical or electro-mechanical devices, components, or systems that generate or emit sound energy representative of flaw, excessive wear, and/or failure (e.g., creating measurable changes in air pressure based on changes in work intensity), and may typically include, without limitation, transformers, switching power converters, air compressors, boilers, chillers, air condensing units, cooling towers, pumps, motors, fans, piston compressors, reciprocal compressors, and the like.

In certain embodiments, one or more of the sound detection device 14 and transducer 16 may be installed as original-equipment-manufactured components of the electromechanical device 12. In alternative embodiments, the sound detection device 14 and transducer 16 may comprise a functional sound detection module 18 installable as an aftermarket component in or relative to the electromechanical device 12. In said embodiments, the type of electromechanical device 12 and location of the electromechanical device 12 or sound detection device 14 may be predefined in accordance with the installation of the component or module 18.

In one embodiment, the transducer 16 in accordance with a sound detection module 18 may be mounted with respect to the electromechanical device 12 at a 0° angle of reference such that the transducer receives sound waves perpendicular to the surface of the electromechanical device 12. The transducer 16 may further be isolated from physical vibrations and other relevant effects generated by the electromechanical device 12 via a shroud formed of a material such as elastic, situated between the electromechanical device 12 and the transducer 16. The shroud may preferably have high form retention characteristics and effective to return the transducer 16 to the preferred 0° angle of reference upon dislocation by, e.g., physical vibration. In certain embodiments, the transducer 16 may be operatively connected to the sound detection device 14 by means of a sound dampening tube of a length corresponding to a distance between the desired mounting position and the module 18.

Due to the extremely low voltage needed to discern the relevant sounds at the most sensitive applicable levels, the module including the shroud and associated material components may desirably be configured to further reduce the peak amplitude of physical vibrations to the transducer 16 from about 1.4 microvolts to 0.3 microvolts, a ~300% vibration dampening effect.

In certain embodiments, the sound detection device 14 may further be able to transmit at least the digital sound data or the digital data files across a communications network 22 to a host server 24. In one embodiment, the sound detection device 14 may transmit digital data files across the Internet by means of a modem to an Internet-connected monitoring server 24. In an alternative embodiment, the sound detection device 14 may transmit digital data files on a local intranet network to a local host server 24. In further embodiments, the local host server may be configured to receive input from a plurality of sound detection devices 14 or other automated monitoring devices and provide a centralized point of feedback for the performance and operation of one or more electromechanical systems.

In certain embodiments, the server 24 (or alternatively, a plurality of functionally and/or communicatively linked servers) may include or otherwise implement a computer-readable medium 26, a processor 30, and a database 32. In execution of a method according to the present invention, the server 24 may be linked to or otherwise access an external database 32b which may be associated with a remote data source in addition to any hosted or otherwise local database or databases 32a residing on or in association with the server(s) 24.

The term "computer-readable medium" as used herein may refer to any non-transitory memory or storage medium or as one of a plurality of non-transitory memory or storage media within which is embodied a computer program product 28 that includes processor-executable software, instructions, program modules, etc., 28a-28e, which upon execution may provide data or otherwise cause a computer system to implement subject matter or otherwise operate in a specific manner as further defined herein. It may further be understood that more than one type of computer readable medium may be used in combination to conduct processor-executable software, instructions, program modules, etc., from a first medium upon which the software, instructions, program modules, etc., initially reside to a processor for execution.

In certain embodiments, the processor 28 may execute software instructions 28 stored on the computer-readable medium 26 effective to receive the digital data files via the network 22 and store said digital data files in the database 32. The processor 28 may further execute software instructions 28 stored on the computer-readable medium 26 effective to determine one or more models of baseline data in association with the digital data files and compare the baseline data to the digital data files for purposes of determining a status of operation. The processor 28 may still further execute software instructions 28 stored on the computer-readable medium 26 effective to identify variations between the digital sound data stored in the database 32 and the selected comparative baseline data and associate said variations with one or more types of failure or substandard operation of the electromechanical device 12.

In further embodiments, the processor 28 may execute software instructions 28 stored on the computer-readable medium 26 effective to create, adjust, or modify baseline data in association with one or more modes of operation and store the modified baseline data in the database 32. In an exemplary embodiment, the processor 28 may execute software instructions 28 effective to determine model baseline data in accordance with digital sound files associated with one or more types of electromechanical devices such that, for a plurality of electromechanical devices 12 one or more modes of operation are determined. In a further exemplary embodiment, the software instructions 28 may be effective to determine model sound data associated with the suboptimal performance or failure of one or more components in the electromechanical device 12 in accordance with a plurality of digital sound files received over a period of time, such that received sound data files of a certain type may be compared against various models to predict the rate of degradation of the electromechanical device 12 or its constituent components.

In certain embodiments, the processor 30 may execute software instructions 28 effective to generate an alert when comparisons indicate a certain mode of operation. The alert may indicate failure, substandard operation, potential failure conditions, and other suboptimal operational modes. In further embodiments, the alert may comprise a diagnostic warning and one or more proposed solutions for curing the suboptimal operational mode.

In certain embodiments, the processor 30 may send an alert across the communications network 22 to an endpoint device 32 associated with a monitoring user. An endpoint device processor 34 may be effective to receive the alert from the communications network 22 and display the alert within a user interface generated on a display device 36 associated with the endpoint device 32. Certain embodiments of the endpoint device 32 may include, for example, a personal computer, a smart phone, a tablet computer, a specialized diagnostic device, a control module for the electromechanical device, and the like.

In further certain embodiments, the personal mobile computing device may execute computer program instructions upon user initiation to generate a user interface including dashboards and associated program tools for purposes of displaying the generated alert. In another embodiment, the display device 32 may be associated with the server 24 in configuration as a control device, monitoring device, or host device for a plurality of sound detection devices 14.

The term "user interface" as used herein may, unless otherwise stated, include any input-output module by which a user device facilitates user interaction with respect to at least the hosted server including, but not limited to, web browsers; web portals, such as individual web pages or those collectively defining a hosted website; telephony interfaces such as interactive voice response (IVR); and the like. Such interfaces may in a broader sense include pop-ups or links to third party websites for the purpose of further accessing and/or integrating associated materials, data, or program functions via the hosted system and in accordance with methods of the present invention. A user interface may further be described with respect to a sound detection device or personal mobile computing device in the context of buttons and display portions which may be independently arranged or otherwise interrelated with respect to, for example, a touch screen, and may further include audio and/or visual input/output functionality even without explicit user interactivity.

In certain embodiments, the device may transform the digital sound data via filtration, reduction, or amplification algorithms effective to improve the comparison of the digital sound data with the baseline data. The device may further or alternatively convert the filtered and amplified digital impulses back to analog signals for user examination of the represented sound data via an acoustical playback device in association with the endpoint device such as, for example, audio speakers.

Figure 2:
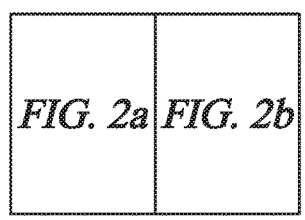
FIGS. 2a and 2b are a flowchart representing an exemplary embodiment of a method for comparative analysis of sound data according to the present disclosure.
Figure 2A:
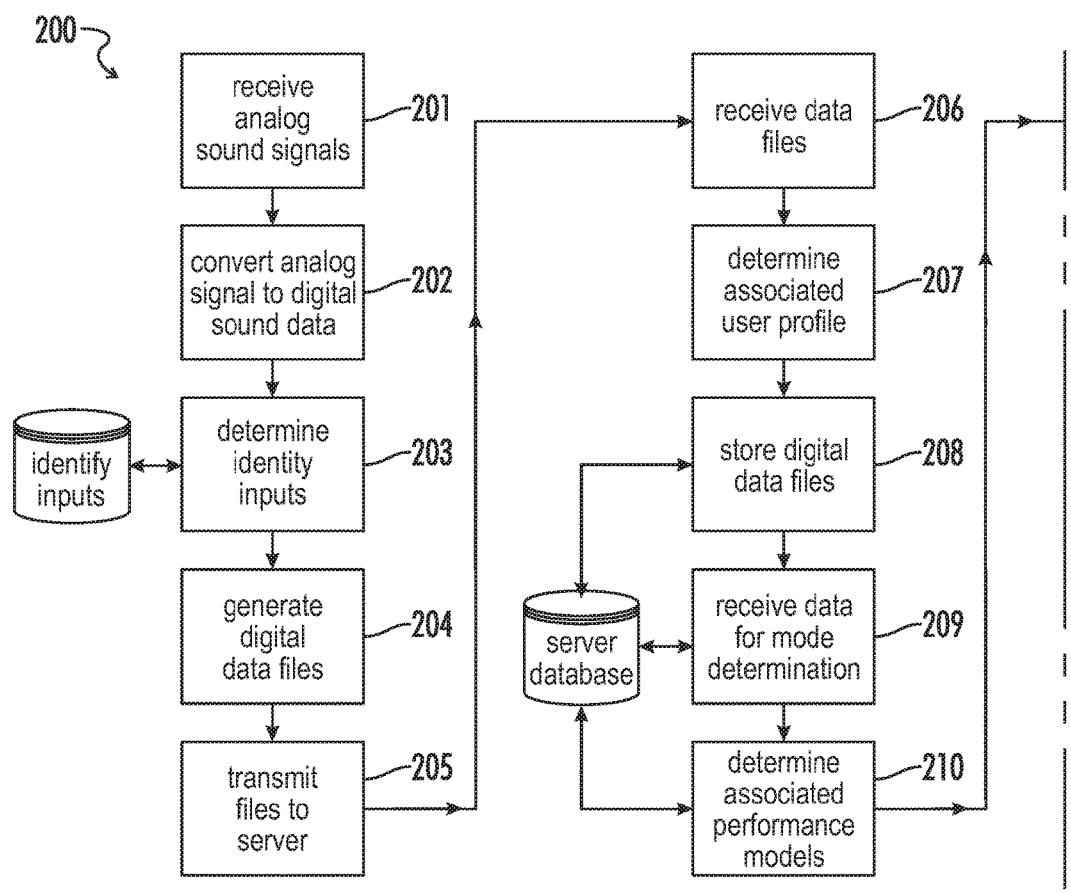
Figure 2B:
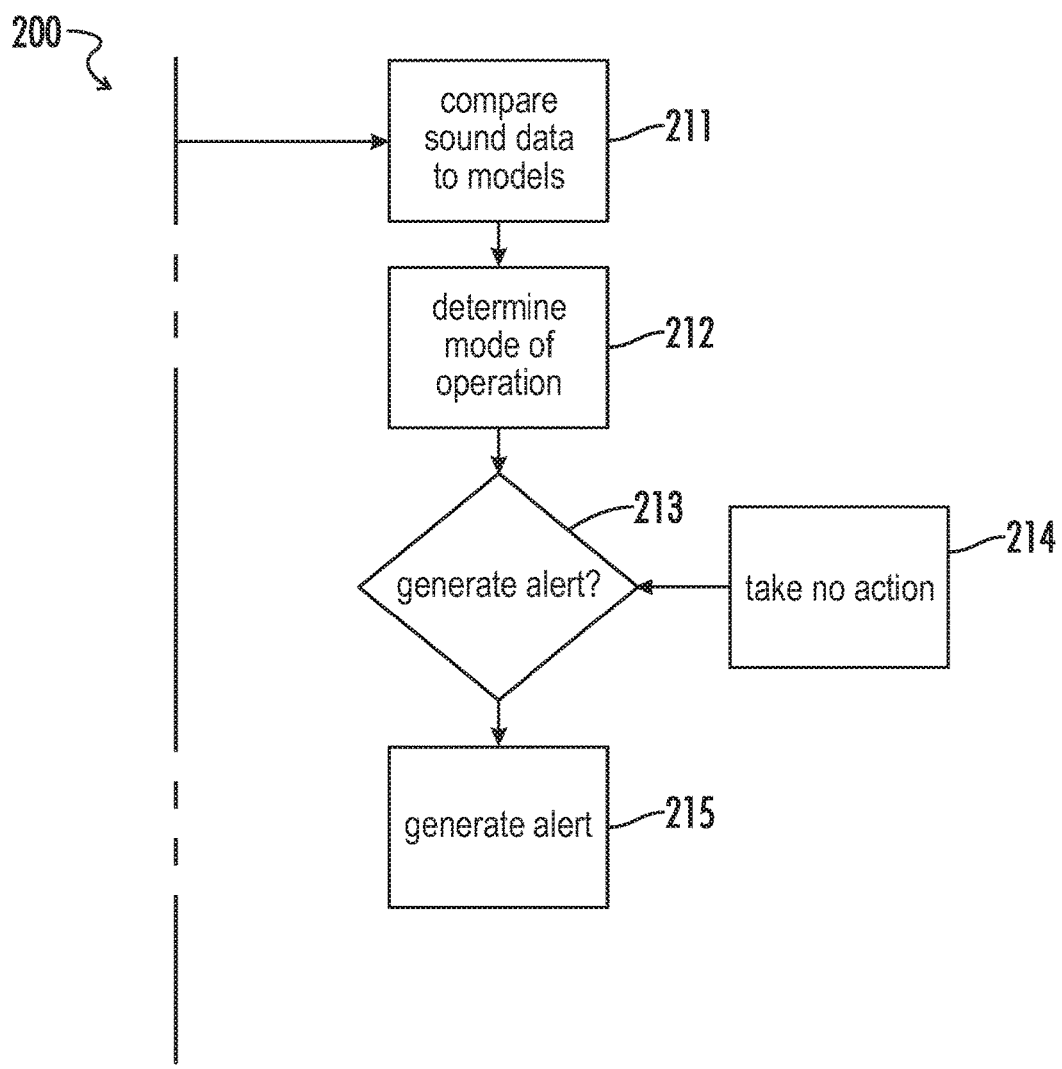

Referring now to FIG. 2, an embodiment of a method for comparative analysis of sound data associated with the operation of an electromechanical device may be described in association with the system represented in FIG. 1.

Steps 201 to 205 refer generally to a method for receiving and transmitting sound data to a server.

The method 200 begins at a first step 201 when a sound detection device receives analog sound signals associated with the operation of an electromechanical device. In step 202, the sound detection device converts the analog sound signal to digital sound data. In certain embodiments, the analog-to-digital conversion may be achieved by means of one or more transducers.

In step 203, the sound detection device determines identity inputs comprising at least location information and electromechanical device type based upon one or more parameters. In certain embodiments, the location information may pertain to the location of the sensor, or in alternative embodiments, the location information may pertain to the location of the electromechanical device. In further embodiments, the electromechanical device type may be determined from a number of predetermined makes and models of electromechanical devices. The identity inputs may be predefined in accordance with the installation of the sound detection device, or alternatively, the sound detection device may determine the identity inputs from signals received via the transducers or via other sensors.

In step 204, the sound detection device associates the digital sound data with the determined identity inputs and generates one or more digital data files comprising the digital sound data and the identity inputs. In step 205, the sound detection device transmits the one or more digital data files to a server across a communications network.

Steps 206 to 212 refer generally to a method for comparing received sound data to model data for purposes of detecting suboptimal electromechanical device performance.

In step 206, the server receives the one or more digital data files from the sound detection device. In certain embodiments, the server may be configured to receive files from a plurality of sound detection devices in association with one or more electromechanical devices. In an embodiment, the server may be employed as an Internet-connected monitoring device for a host user to monitor the ongoing performance of certain electromechanical devices associated with clients across a broad geography. In another embodiment, the server may function as an on-site monitoring device for one or more electromechanical devices within a given geographical location, such as, for example, an office building or industrial complex. The receipt of the files may be performed either periodically or continuously.

Upon receiving the digital data files, the server determines from the identity inputs within the digital data files an associated user profile (207). The user profile may be associated with any number of uniquely identifying traits, such as an electromechanical device SKU, a model number, a client name and device ID, a geographic location, and the like. The server then stores the received digital data files in one or more databases in association with the user profile (208).

In step 209, the server retrieves the digital sound data associated with a user profile for purposes of determining one or more modes of operation for an electromechanical device. In certain embodiments, the server may retrieve a plurality of digital sound data, such as, for example, the sound data received from all sound detection devices installed in an electromechanical device, or a period of historical sound data generated by a single sound detection device.

The server then determines one or more associated performance models against which to compare the digital sound data of the retrieved sound files (210). In certain embodiments, the performance models may be preconfigured in association with operative modes of performance for a particular electromechanical device. For example, the server may be configured to retrieve models associated with various modes of general performance for an electromechanical device of a certain type, make, or model. In further embodiments, the server may be configured to retrieve models associated with the failure or suboptimal performance of specific components within the electromechanical device. In still further embodiments, the server may generate performance models from analysis of historical trend data determined from the electromechanical device or a plurality of devices of similar type, make, or model.

In step 211, the server compares the retrieved digital sound data with the determined performance models. In certain embodiments, the server may optionally perform certain transformations to the digital sound data to effect a better comparison, such as, for example, reducing noise, applying filters, removing data point outliers, amplifying the signal, and the like. In an embodiment, the server may compare the digital sound data to a series of performance models to find matched similarities indicating mode of operation. In an alternative embodiment, the server may compare the digital sound data to one or more performance models to determine identifiable differences indicating a mode of operation. From the comparison, the system determines a mode of operation for the electromechanical device (212).

Steps 213 to 215 refer generally to a method for generating an alert effective to notify a user of suboptimal operation of the electromechanical device.

On determination of a mode of operation in accordance with step 212, the server then determines from the diagnosed mode of operation whether an alert should be generated (213). In certain embodiments, certain modes of operation may be pre-associated with alert generation. For example, certain modes of operation associated with the failure of certain components within the electromechanical device may be associated with alert statuses. In alternative embodiments, the server may determine whether to generate an alert based upon one or more predictive analysis models, such as predicting the failure of a device component from a history of sound data.

If the server determines that no alert should be generated, the system returns to its default monitoring state without taking further action (214). Alternatively, if the server determines that an alert should be generated, it instead proceeds to step 215 and generates an alert to notify an end-user as to the status of the electromechanical device. In preferred embodiments, the server may include with the alert diagnostic information and/or proposed corrective actions. In certain embodiments, the server may send the alert across the to an end-point device associated with the end-user. In one or more steps not depicted, the endpoint device may generate a user interface and, upon receipt of the alert from the server, populate the user interface with the alert and respective alert information. In further optional steps, the server may determine whether corrective action has been performed by, for example, receiving notification from the user that corrective action has been performed. In an alternative example, the server may determine whether corrective action has been performed when received sound data indicates optimal performance has resumed. In still another example, the server may receive notification from specially configured sound detection devices effective to forward repair log data that an authorized repair has been performed.

Figure 3:
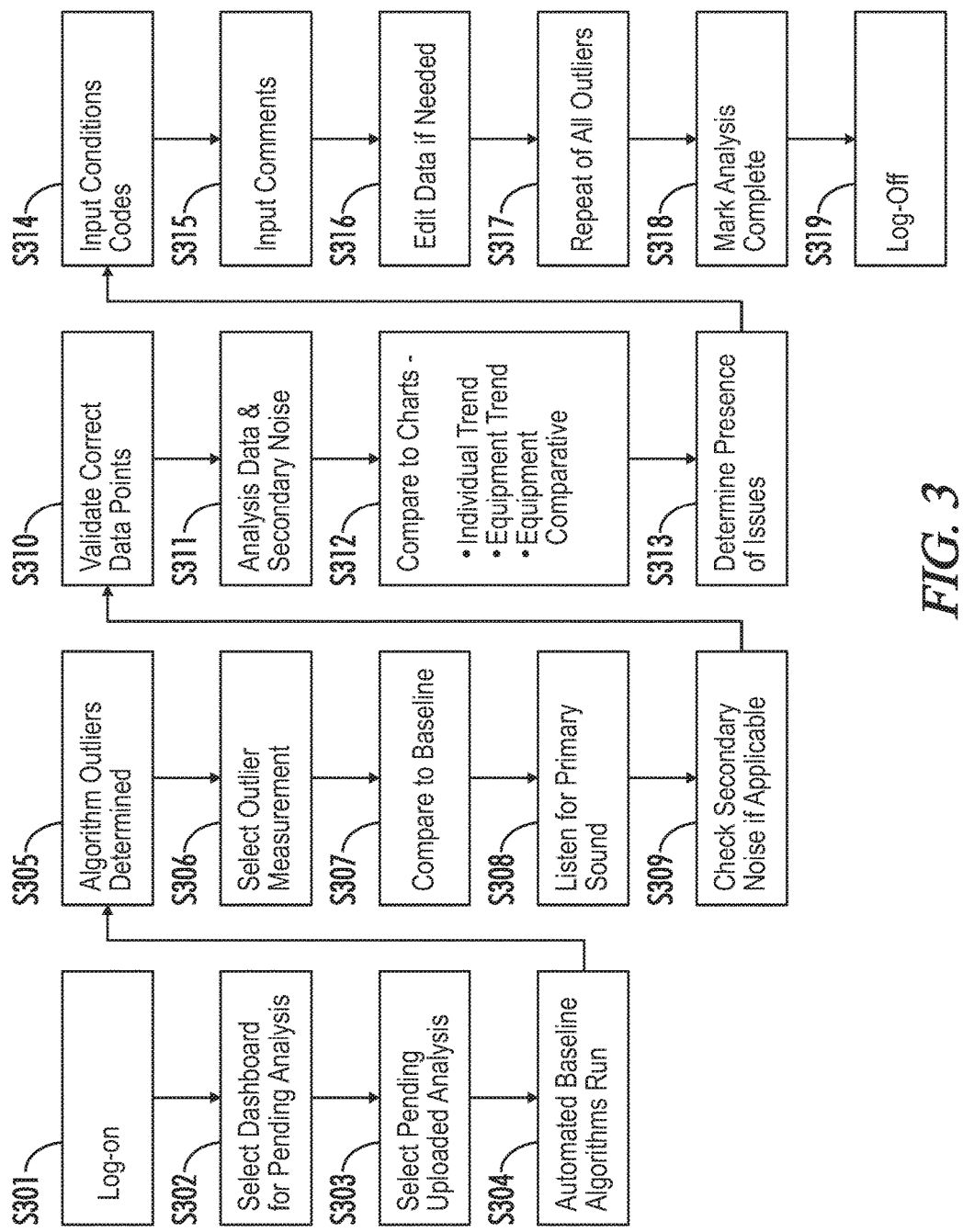
FIG. 3 is a flowchart representing an exemplary data analysis process in accordance with embodiments of the present disclosure.

Referring now to FIG. 3, an exemplary process may be described whereby a technician associated with a program partner (or for example a technician or administrator associated with the host) in accordance with systems, methods and algorithms as disclosed herein may perform analysis the surveyed sound files with respect to a particular customer, property or electromechanical device, and in various embodiments further with respect to historical and aggregated data with respect to a number of customers, properties and electromechanical devices.

The technician begins by logging in to a user interface (e.g., website) generated by or in association with the host program (S301) which enables selection of a dashboard configured for pending analysis (S302), and further enables the selection of any one of a number of pending analyses (S303). The technician may implement program tools and back-end algorithms to for example identify or determine baseline data associated with the electromechanical device, and/or inspection point (S304), and further to identify or determine any outliers in the sound data with respect to the data itself or historical data associated therewith, and irrespective of the baseline (S305).

Program tools further may enable the technician to select a particular outlier measurement (S306) and perform a comparative analysis with respect to the identified or determined baseline (S307).

Program tools further may enable the technician to select sound files associated with the selected analysis and listen for primary sound (S308), check for the presence and/or effect of secondary noise where applicable (S309), and validate that the associated data points are correct (S310).

Comparative analysis tools may be provided by the system to enable the technician to analyze the sound data and secondary noise (S311) by way of direct review and analysis of the individual data points or by way of visual comparison via charts, graphs, etc., representing an individual trend, electromechanical device trend, device comparisons with respect to historical or aggregated data for related electromechanical devices stored in the system, etc. (S312). Using any or all of the above tools, or others as may be known in the art and further provided within the scope of the present invention, the technician may determine the presence of issues with respect to the electromechanical device in question (S313) and input condition codes (S314) and/or comments (S315) in association with the equipment. Such input may be in the form of line items in an equipment profile as may be displayed upon later request with respect to that piece of equipment, or as may take the form of tags or an equivalent that may be searchable by a user with respect to such conditions or comments generally. The technician may edit data as needed or desired (S316).

The process steps S306-S316 may then be repeated (S317) for all outliers having been determined by the system algorithms in step S305, and the technician may subsequently or otherwise mark the analysis as complete (S318). The process steps S303-S318 may likewise be repeated for all uploaded analyses as may be pending. The technician may otherwise log off from the user interface/website/program (S319).

Figure 4:
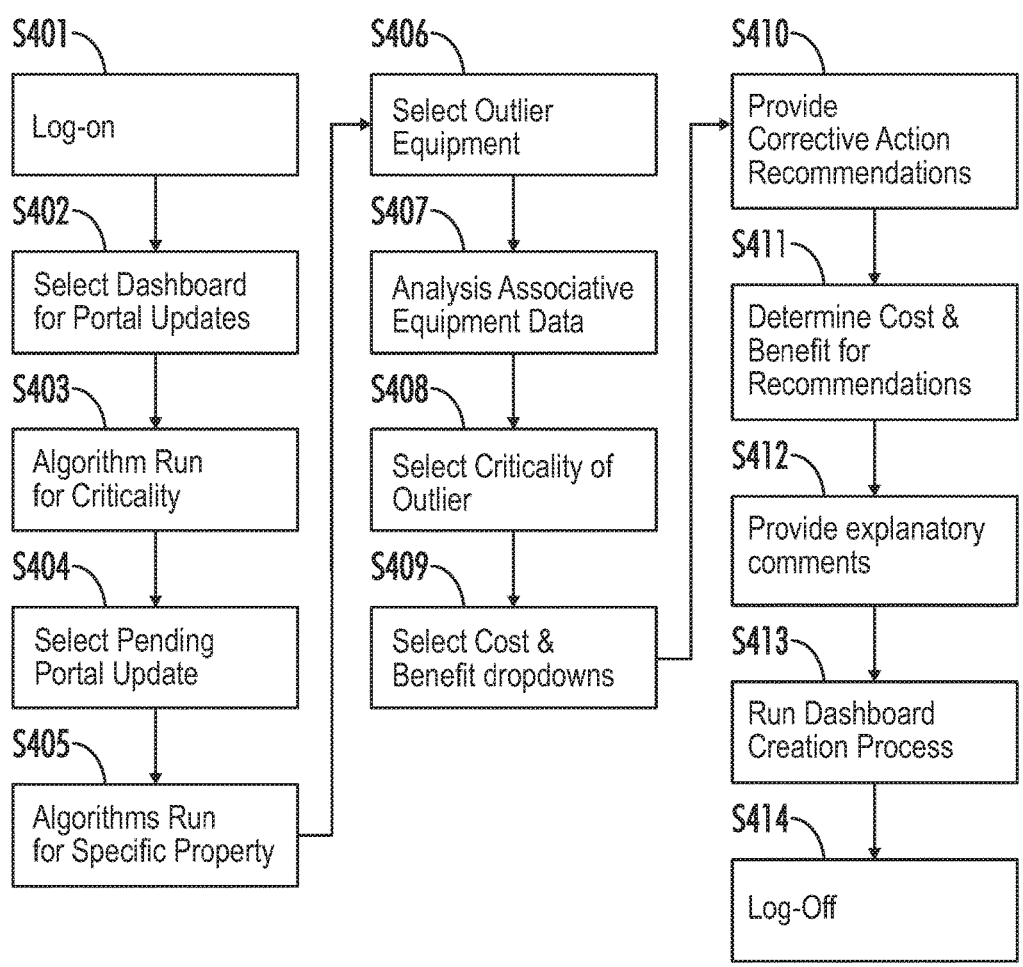
FIG. 4 is a flowchart representing an exemplary user interface process for analyzing critical data and providing recommendations in accordance with embodiments of the present disclosure.

Referring now to FIG. 4, an exemplary process may be described whereby an entity such as a program partner in accordance with the present invention may identify critical data based on results from one or more of the above-referenced processes, and perform cost-benefit analyses with respect to maintenance or potential corrective actions.

The technician begins by logging in to a user interface (e.g., website) generated by or in association with the host program (S401) which enables selection of a dashboard configured for portal updates (S402). The technician may implement program tools and back-end algorithms to generate system updates with respect to equipment and/or inspection points and further assess the criticality of results from the previous analyses (S403). Program tools enable the technician to select one from a list of pending portal updates (S404), and execute algorithms to identify and assess critical data points with respect to a specific associated property (S405). The program tools further enable the technician to select outlier equipment with respect to the property, or alternatively from a searchable list of equipment with respect to other key parameters or criteria (S406), and execute algorithms to analyze the associated equipment data (S407).

The technician may be enabled by the system to select, determine or define a criticality of the selected outlier equipment (S408). The dashboard may in various embodiments include a cost-benefit dropdown menu, hyperlinks, or some equivalent that is selectable by the user (S409). The technician may provide a corrective action recommendation (S410), and determine the costs and benefits for the provided recommendation by executing appropriate algorithms from the system (S411). As needed or desired, the technician may provide explanatory comments with respect to the provided recommendation and associated cost-benefit analysis (S412), and execute a dashboard creation process that may for example assemble or modify the customer dashboard based on the results generated in this and previously recited processes of the present invention (S413).

Figure 5:
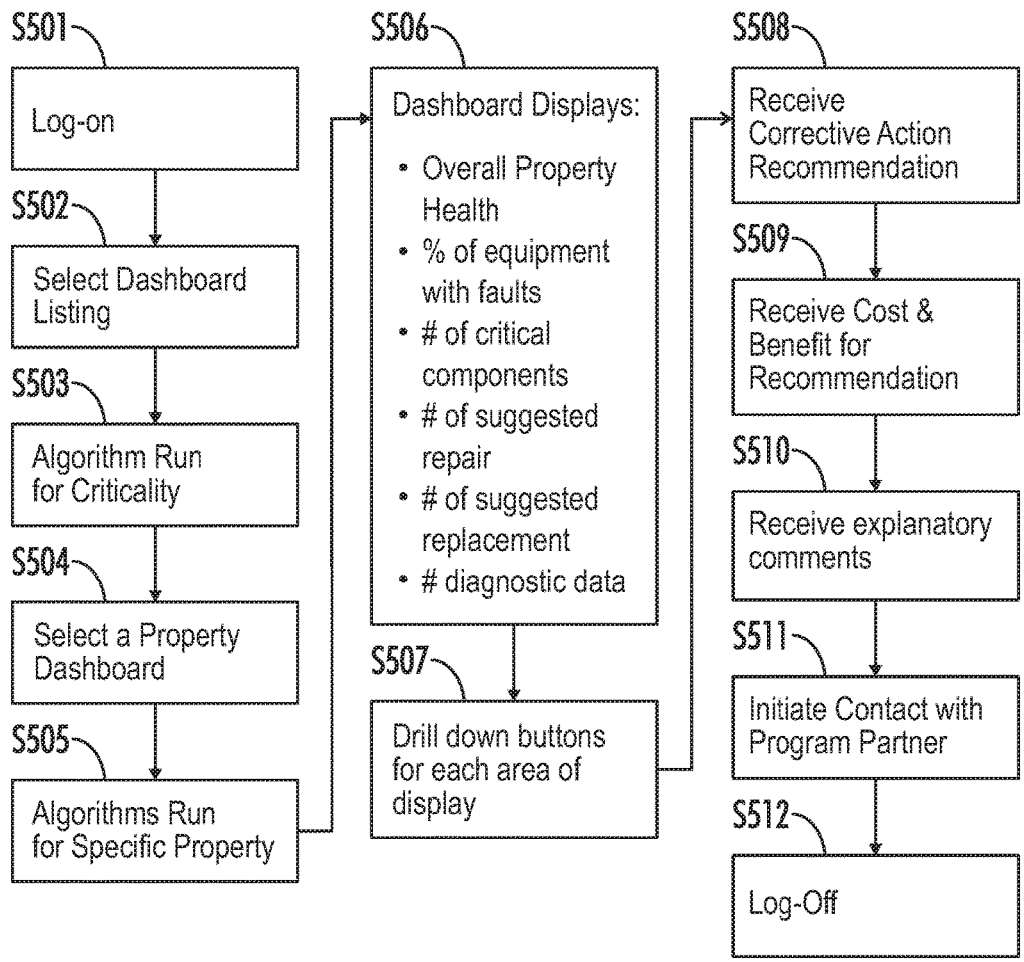
FIG. 5 is a flowchart representing an exemplary user interface process for receiving, reviewing and filtering results in accordance with embodiments of the present disclosure.

Referring now to FIG. 5, an exemplary process may be described whereby an entity such as a customer in accordance with the present invention may review results generated by the algorithms and program tools.

The customer begins by logging in to a user interface (e.g., website) generated by or in association with the host program (S501) which enables selection of any one of a number of available dashboards for that customer (S502). The customer may implement program tools and back-end algorithms to generate any critical system updates (S503). Program tools enable the customers to select one from a list of properties (S504), and execute algorithms to generate results for that property and accordingly populate a template for that dashboard with the appropriate results data (S505). Exemplary dashboard displays may include without limitation an overall property health value (which may be for example an assigned value such as "good" or may be a continuous variable as generated using appropriate algorithms and underlying component values); a percentage of equipment with faults; a current number of critical components; a current number of suggested repairs; a current number of suggested replacements; historical values for any of the above; any fixed diagnostic data values and/or diagnostic data variables as may be determined from any of the above (S506).

In various embodiments, the dashboard may be configured to include drill down buttons for each area of display (S507) such that the system may simply expand and display previously hidden data, or may alternatively further provide decision support capabilities such as for example online analytical processing (OLAP) such that the above-referenced values and variables may be analyzed with respect to a number of dimensions (e.g., time, location, technician).

The customer may be enabled by the system to receive (directly or by user selection) a corrective action recommendation as previously provided from a technician (S508), and to review an associated cost-benefit analysis for that recommendation (S509) and any explanatory comments from the technician (S510). If for example the customer elects to conduct further maintenance or other preventative action, the customer may be enabled by the system to directly initiate contact with the program partner or the host itself (S511), or alternatively to simply log off from the system (S512).

Figure 6:
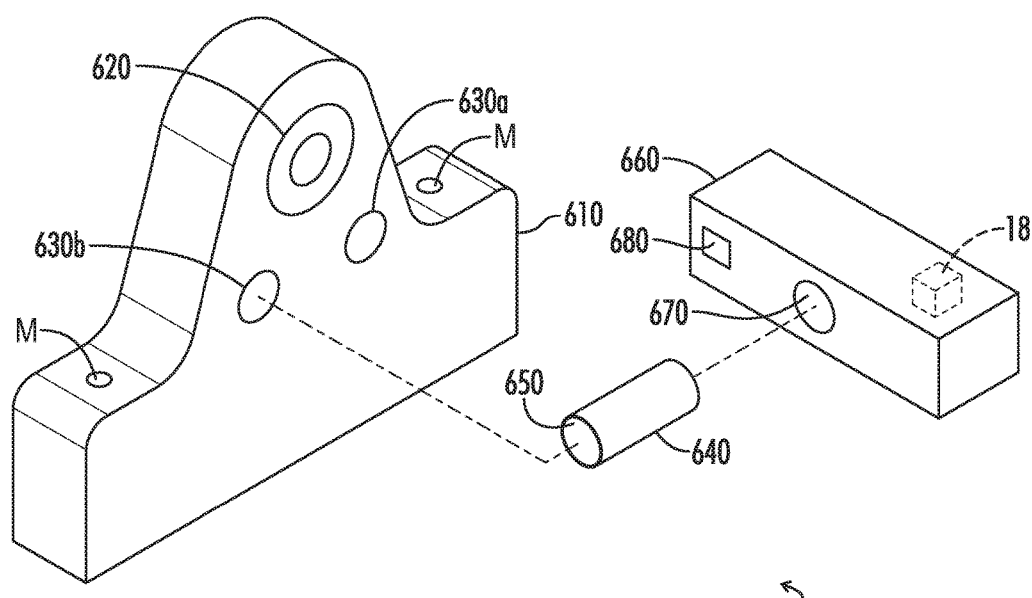
FIG. 6 is an exploded view of an exemplary embodiment of a system for remotely collecting sound and device data for an electromechanical device according to the present disclosure.

FIG. 6 illustrates an exploded view of an exemplary embodiment of a system 600 for remotely collecting sound and device data for an electromechanical device according to the present disclosure. The system 600 includes at least one or a housing 610, a dampening tube 640, and a transducer box 660. The housing 610 may include a pillow block housing, an exterior surface, an internal surface, or one or more components associated with an electromechanical device (e.g., the electromechanical device 12). The housing 610 may include a mounted bearing 620 and one or more mounting positions M. In one exemplary embodiment, the housing 610 is a pillow block housing included as part of an electromechanical device 12. The one or more mounting positions M configured to couple the housing 610 to a surface, such as a surface of at least one component of the electromechanical device 12. One or more mounting positions M may be a screw hole, a through hole, a position indicator, or any other opening or indicia associated with coupling the housing 610 to a surface or object.

The housing 610 may include one or more cavities 630. For example, the housing 610 includes two cavities 630*a* and 630*b* in the embodiment illustrated in FIG. 6. Each cavity 630 may be formed in the housing 610 at a time of manufacture, and/or may be drilled or bored after manufacture (for example, as described herein with reference to FIG. 10). Each cavity 630 may be configured to operate as at least one of an air gap within a body of the housing 610 and/or an anchoring position. For example, in one exemplary embodiment, one or more of a shape, size, characteristic, or configuration of a cavity 630 may correspond to an air gap implementation (e.g., as illustrated by cavity 710) or an anchoring position implementation (e.g., as illustrated by anchor cavity 720), while in another exemplary embodiment, one or more of the shape, size, characteristic, or configuration of a cavity 630 may be implemented in a manner permitting use as both an air gap implementation and an anchoring position implementation.

The cavity 630 may comprise an air chamber configured to approximate an air chamber at an exterior surface of the housing 610 (as contrasted from an air chamber where the air is contained or enclosed). Using an open-air chamber offers a plurality of advantages over a contained or enclosed air chamber. For example, an enclosed air chamber may be exposed to 360-degree vibration through the metal of the housing 610 as well as exposure to the distal end metal would create a chaotic closed air chamber situation. As a result, highly variable and dissimilar percentage readings as well as a cluttered sound signature may be introduced. Thus, in one exemplary embodiment, exposure to the distal end may be limited and atmospheric air pressure may be ensured using an open-air chamber. The open-air chamber may be advantageous to increase or maximize attenuation of an original sound source in certain situations, such as one with a very low level of intensity (e.g., in a range between 0.1-3.0%).

One or more cavities 630 may be configured to receive at least a portion of the dampening tube 640 therein. In one exemplary embodiment, at least one of a size and a shape of the one or more cavities is designed such that the at least a portion or the entire dampening tube 640 is not placed in contact with a surface of the housing 610 when at least a portion of the dampening tube 640 is inserted into the one or more cavities 630 of the housing 610. The dampening tube 640 has a hollow portion 650 extending through the dampening tube 640 in a longitudinal direction of the dampening tube 640. The dampening tube 640 may be made of a flexible or rigid material. In one exemplary embodiment, the dampening tube 640 is made of a silicon material. The dampening tube 640 may be made of a material in various embodiments such that at least one of sound and vibration associated with a housing 610 and/or electromechanical device 12 is reduced, controlled, or eliminated. At least one of an inner diameter and an outer diameter of the dampening tube 640 may be selected or determined based at least in part upon a desired implementation configuration, an acoustic or vibration characteristic of a particular material, or any other parameter or desired characteristic of at least one of the dampening tube 640, the housing 610, the electromechanical device 12, or any combination thereof. Although illustrated in FIGS. 6-8 as being a linear circular section, it should be appreciated that the dampening tube 640 may include at least one section which is non-circular and/or which is curved or otherwise non-linear, without departing from the spirit and the scope of the present disclosure.

The transducer box 660 includes at least one of an opening 670, at least one mounting point 680, and a sound detection module 18. The opening 670 is configured to receive or otherwise couple to at least a portion of the dampening tube 640. In one exemplary embodiment, least one of a size or shape of the opening 670 and/or dampening tube 640 is configured such that an outer surface of the dampening tube 640 is placed in contact with an inner surface of the opening 640. Additionally or alternatively, at least a portion of the dampening tube 640 or opening 670 may be configured such that an outer surface of the dampening tube 640 is not placed in contact with the opening 670 and/or any other surface of the transducer box 660. At least one of the dampening tube 640 and sound detection module 18 may be configured such that the sound detection module 18 is configured with respect to the electromechanical device 12 at a substantially 0° angle of reference such that a transducer 16 associated with the sound detection module 18 receives sound waves perpendicular to the flow direction of the sound waves received from the dampening tube 640 (e.g., as illustrated by FIG. 7).

Figure 8:
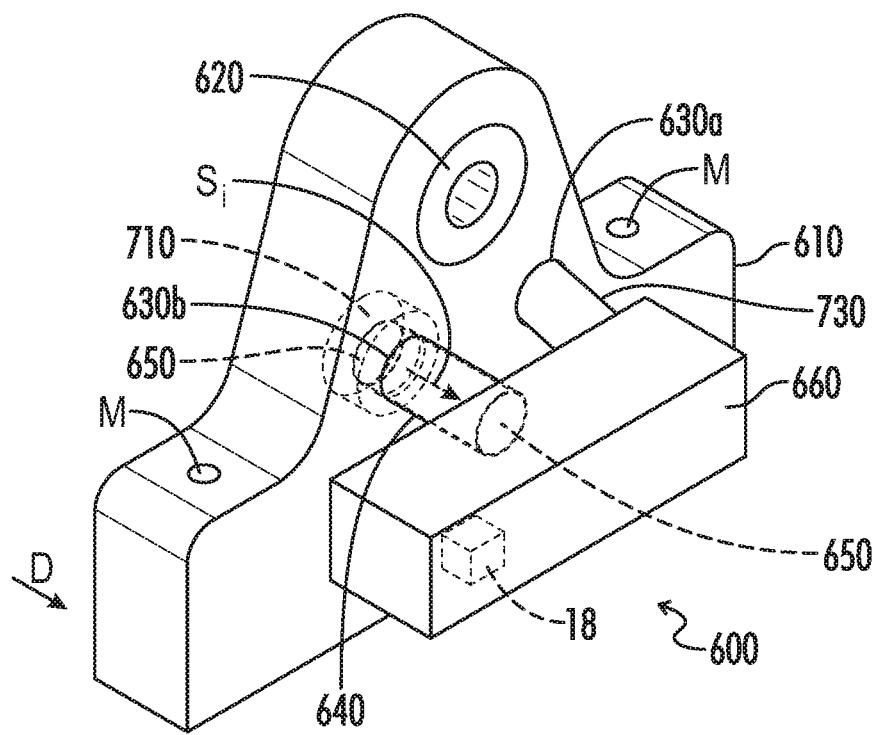
FIG. 8 illustrates a perspective view of an exemplary embodiment of a transducer box connected to a housing according to the present disclosure.

The transducer box 660 includes at least one mounting point 680. The at least one mounting point is configured to connect the transducer box 660 to the housing 610, for example at a cavity 630 (e.g., cavity 630*a*, as illustrated by FIG. 8). At least one mounting point 680 may be located at an external surface of the transducer box 660. Each mounting point 680 may be a fastener, connector, or connection point otherwise configured to mechanically couple the transducer box 660 to the housing 610 and/or electromechanical device 12. One exemplary embodiment of the transducer box 660 is mechanically coupled to the housing 610 via at a single mounting point 680 as illustrated by and described with reference to FIG. 8. In one exemplary embodiment, the at least one mounting point 680 is configured to provide at least one of structural support, rigidity, and/or positioning to the transducer box 660. Although described with reference to an external surface of the transducer box, it should be appreciated that at least a portion of the at least one mounting point 680 may include a through hole or other opening or cavity configured to enable or maintain coupling to at least one of the housing 610 or electromechanical device 12.

Figure 7:
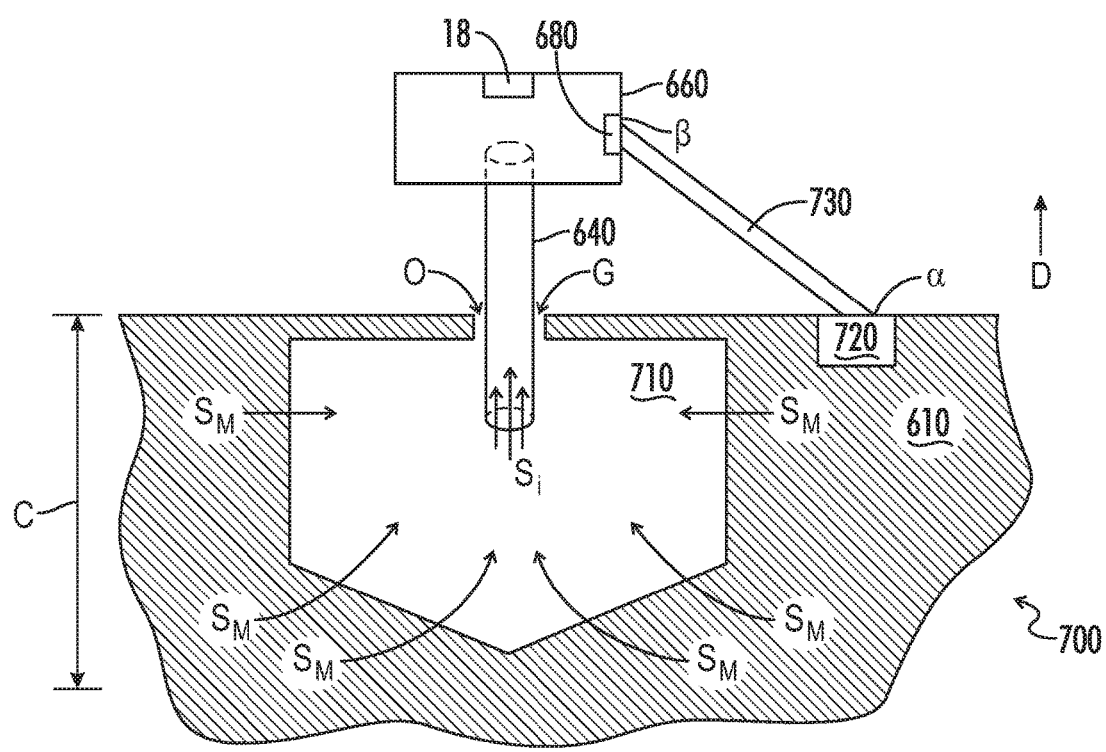
FIG. 7 is a partial internal view of an exemplary embodiment of a housing cavity according to the present disclosure.

FIG. 7 is a partial internal view 700 of an exemplary embodiment of a housing cavity according to the present disclosure. The housing 610 includes a cavity 710 extending inwardly from an external surface of the housing 610 to a depth C. In one exemplary embodiment, the depth C is one inch, although the depth C may be any depth capable of receiving at least a portion of the dampening tube 640 and/or transmitting at least one of sound and vibration data to the transducer box 660. The depth C of the cavity may be modified during operation and/or may depend upon a characteristic of a material of the housing 610 or transducer box 660 in various embodiments. A shape or length of a surface of the cavity 710

The cavity 710 may include an opening O formed at an external surface of the housing 610. The opening O may be configured to receive at least a portion of the dampening tube 640 and to allow the at least a portion of the dampening tube 640 to enter the cavity 710. In one exemplary embodiment, at least one of the dampening tube 640 and the opening O are configured with a size and/or shape configured such that a gap G exists between an outer surface of the dampening tube 640 and an inner surface of the opening O. At least one of a shape, size, and configuration of the cavity 710 may be determined based on an acoustic or vibration property of the housing 610. During operation, mechanical sound Sm is received within the cavity 710 from the housing 610. At least a portion of the mechanical sound Sm passes through the dampening tube 640 towards the transducer box 660 as input sound Si in a distal direction D extending outward from the housing 610.

The housing 610 may include at least one anchor cavity 720. In one exemplary embodiment, the anchor cavity 720 is equivalent to previously-described cavity 630a. The anchor cavity 720 may be configured to receive and/or couple to at least one anchor 730. The anchor 730 is configured to provide at least one of structural support, rigidity, and/or positioning to the transducer box 660 relative to the housing 610. Although described with reference to a cavity, it should be appreciated that the anchor cavity 720 may be an opening, cavity, connector, contact point, and/or connection location configured to be placed in contact with and/or couple to an anchor 730. The anchor 730 may be configured to couple to a transducer box 660 at a first end thereof at an anchor contact point α (e.g., at a mounting point 680) and to the housing 610 at an opposite end thereof at a housing contact point β (e.g., at a cavity 630a). The anchor 730 may be formed of any material capable of providing sufficient rigidity and/or sound or vibration suppression commensurate with a particular implementation. In various embodiments, the anchor 730 may be formed at least in part of metal, rubber, plastic, or any other material having sufficient properties.

FIG. 8 illustrates a perspective view of an exemplary embodiment of a transducer box connected to a housing according to the present disclosure. In the embodiment illustrated by FIG. 8, at least a portion of a first end of the dampening tube 640 is inserted into the cavity 710, while at least a portion of a second end of the dampening tube 640 is inserted into or otherwise coupled to the transducer box 660. The input sound Si corresponding to the mechanical sound Sm is configured to be received at the first end of the dampening tube 640 and to pass through the dampening tube 640 and into the transducer box 660. In one exemplary embodiment, a transducer 16 associated with the sound detection module 18 receives sound waves perpendicular to the flow direction of the sound waves received from the dampening tube 640 (e.g., at a substantially 0° angle).

The anchor 730 of FIG. 8 is mechanically connects the housing 610 (at cavity 630a) to the transducer box 660 (at mounting point 680) as previously described herein. Although illustrated with a single anchor 730, it should be appreciated that implementations consistent with the present disclosure may optionally have two or more anchors 730 without departing from the spirit and scope of the present disclosure. For example, in a high-vibration environment multiple anchors 730 may be coupled between the housing 610 and the transducer box 660. Similarly, a plurality of anchors 730 may be used in implementations where the transducer box 660 is located at a distance from the housing 610 such that the plurality of anchors 730 are necessary for sufficient rigidity and/or positioning (e.g., to prevent contact between a surface of the dampening tube 640 and at least one of the inner surface of the opening O or the opening 670.

Figure 9:
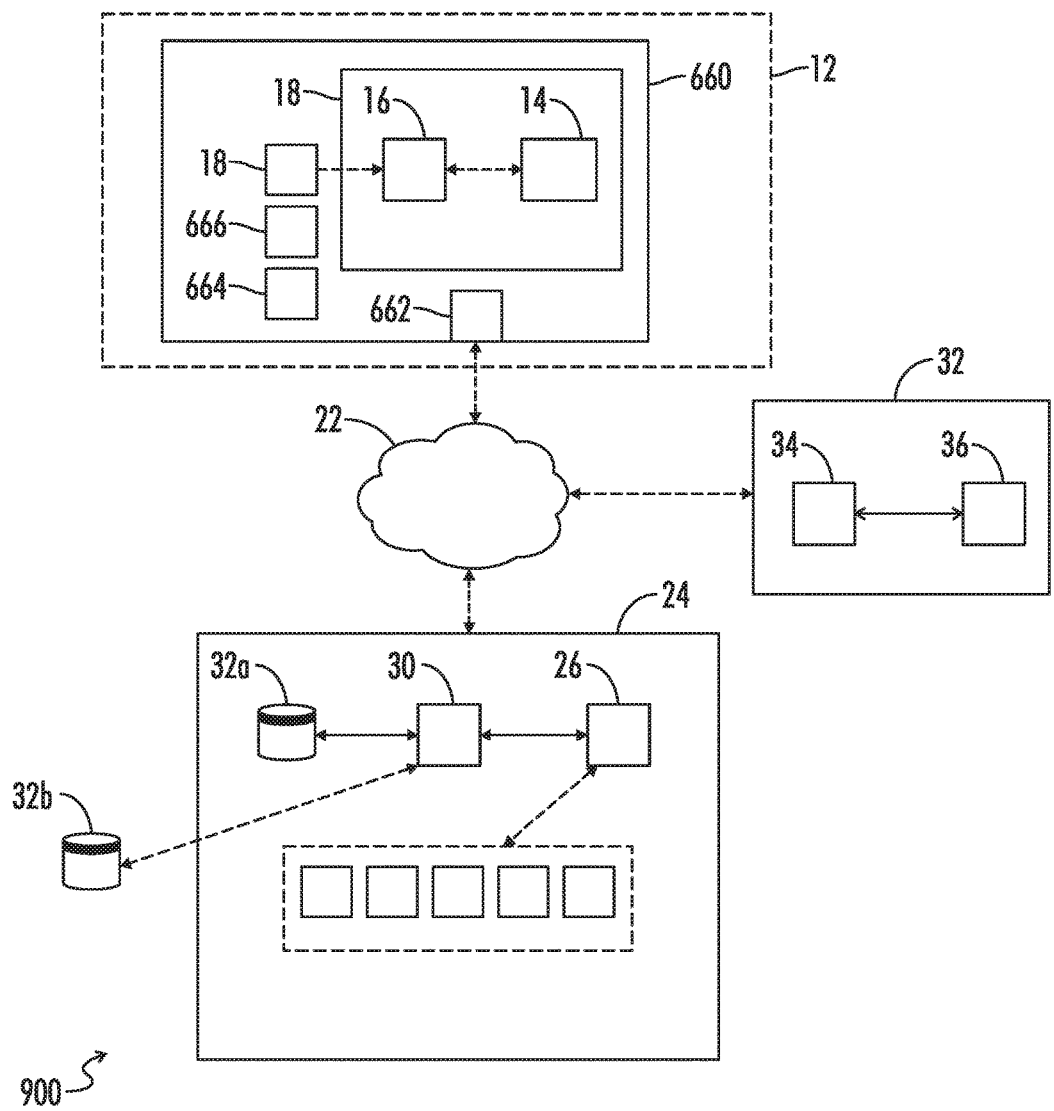
FIG. 9 is a block diagram representing an exemplary embodiment of a system for comparative analysis of sound data according to the present disclosure.

FIG. 9 is a block diagram representing an exemplary embodiment of a system for comparative analysis of sound data according to the present disclosure. The system 900 of FIG. 9 may be identical to the system 10, except with reference to the electromechanical device 12. The electromechanical device 12 according to the exemplary embodiment illustrated by FIG. 9 may include or otherwise be mechanically and/or electronically coupled to a transducer box 660. For example, the electromechanical device 12 may include a housing (e.g., housing 610) to which the transducer box 660 is coupled to using mounting points M or an alternative coupling means).

The transducer box 660 may include one or more sound detection modules 18, one or more of which may include a transducer 16 and/or sound detection module 14. The transducer box 660 may further include a communications interface 662. The communications interface 662 may be communicatively coupled to the communications network 22 via at least one of a wired or wireless communication link. For example, the communication interface 662 may include a Bluetooth module configured to communicate with at least one other entity via Bluetooth networking using the Bluetooth protocol. Additionally or alternatively, the communications interface 662 may include a wireless networking module configured to communicate with one or more entities using wireless networking protocols via the communications network 22. In one exemplary embodiment, the transducer box 660 is configured to communicate at least one signal corresponding to at least one sound detection module 14, 18 to at least one of the server 24 and/or database 32 via wired or wireless communications enabled by the communication interface 662.

The transducer box 660 may further include at least one power input 664. The power input 664 may be configured to receive operating power and to provide the operating power to at least one component of the transducer box 660. The power input 664 may be configured to receive power, for example, from an alternating current (AC) power source such as a mains input line, from a DC power source such as a DC power line or battery, or from any other source of input power capable of powering at least one component of the transducer box 660. The transducer box 660 may further include at least one microprocessor 666. The microprocessor 666 may be configured to perform, enable or otherwise operate upon one or more sets of data and/or steps described in relation to the transducer box 660 and components thereof, as well as operations associated therewith and/or data associated therewith. For example, in one exemplary embodiment, the microprocessor 666 is configured to operate upon data obtained by a sound detection module 18 and to cause the transducer box 660 to communicate a representation of the obtained data to the server 24 via the communications interface 662. Additionally or alternatively, at least one data processing operation associated with at least one of the server 24 and/or database 32 may be performed, either in whole or in part, at the transducer box in association with the microprocessor 666.

Figure 10:
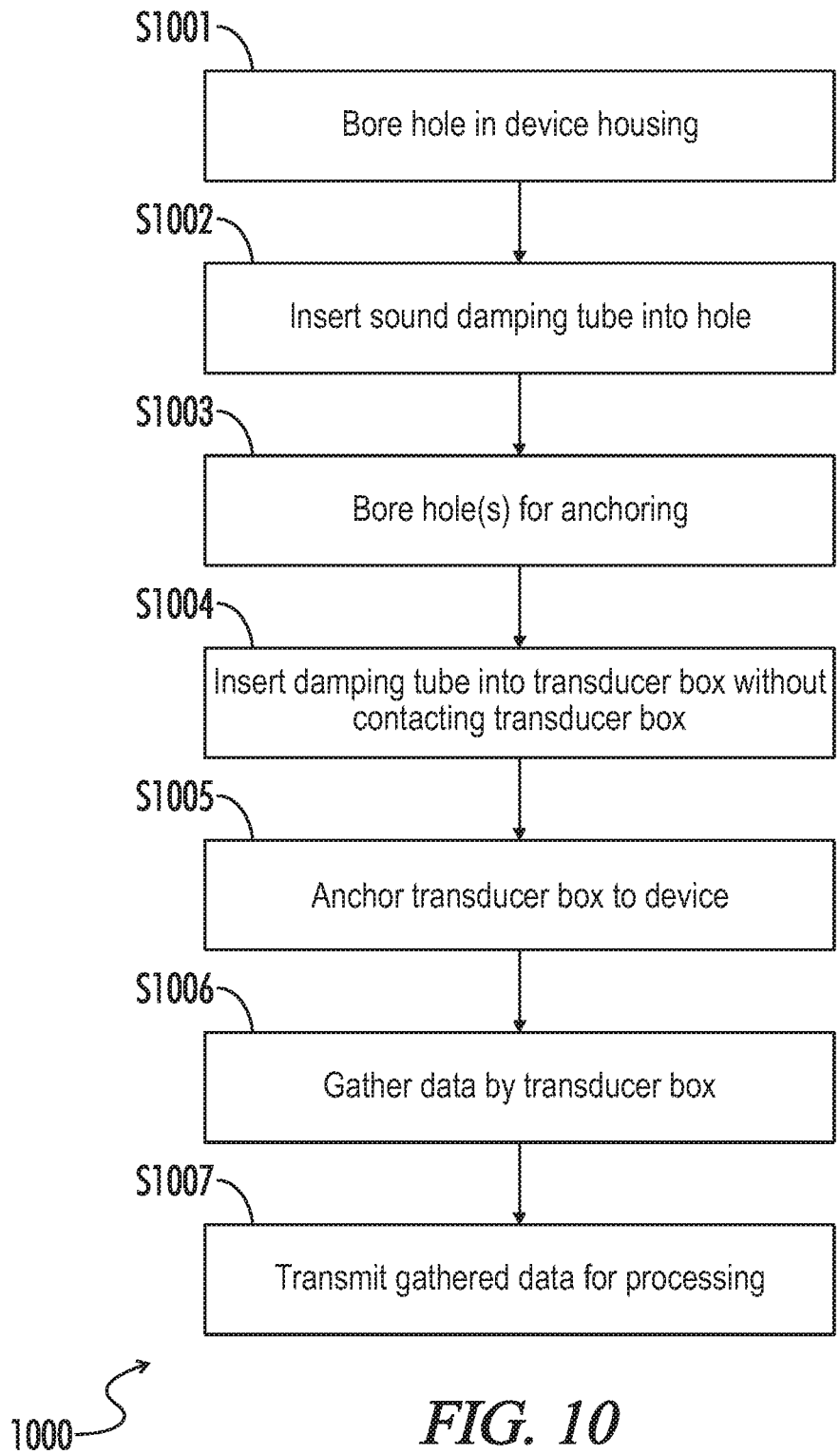
FIG. 10 is a flowchart representing an exemplary equipment sound monitoring process in accordance with embodiments of the present disclosure.

FIG. 10 is a flowchart representing an exemplary equipment sound monitoring process 1000 in accordance with embodiments of the present disclosure. The process begins at a step S1001 where one or more holes are drilled or bored in a device housing to form one or more cavities 630. The device housing may be a housing 610 associated with an electromechanical device 12 in one exemplary embodiment. Additionally or alternatively, at least one of the one or more holes may be formed in the housing 610 during manufacture and/or may be bored at any point in time between manufacture and desired implementation. A depth of one or more holes may be configured to correspond at least in part to a size, shape, type, or characteristic of at least one of the housing 610, the dampening tube 640, the opening O, the opening 670, the transducer box 660, and/or at least one anchor 730.

After the one or more holes are established, the process continues to a step S1002, where at least a portion of the dampening tube 640 is inserted into a hole in the housing 610. As previously described, an exterior diameter of the dampening tube 640 may be configured to leave a gap G between an inner surface of the opening O and the exterior surface of the dampening tube 640. One or more anchoring holes may be bored at a step S1003. Additionally or alternatively, at least one anchor hole may be formed in the housing 610 during manufacture or may be created at any point in time between manufacture and implementation. A least a portion of the dampening tube 640 is inserted into and/or coupled to the transducer box 660 at a step S1004. Either before or after coupling the dampening tube 640 to the transducer box 660, the transducer box 660 may be anchored to the housing 610 at step S1005 and/or a position of at least one of the transducer box 660, and the housing 610 may be modified to permit proper positioning between the transducer box 660 and the housing 610. After installation, the transducer may gather one or more of sound and vibration data associated with the housing 610 via the dampening tube 640 at a step S1006. The one or more sets of data may be transferred to the server 24, for example via a communications network at a step S1007. The communications network may be a Bluetooth network, a local area network (LAN), the Internet, or any other communications network. Communications between the transducer box 660 and the communications network may be via wired connection, wireless connection, or a combination thereof.

Figure 11:
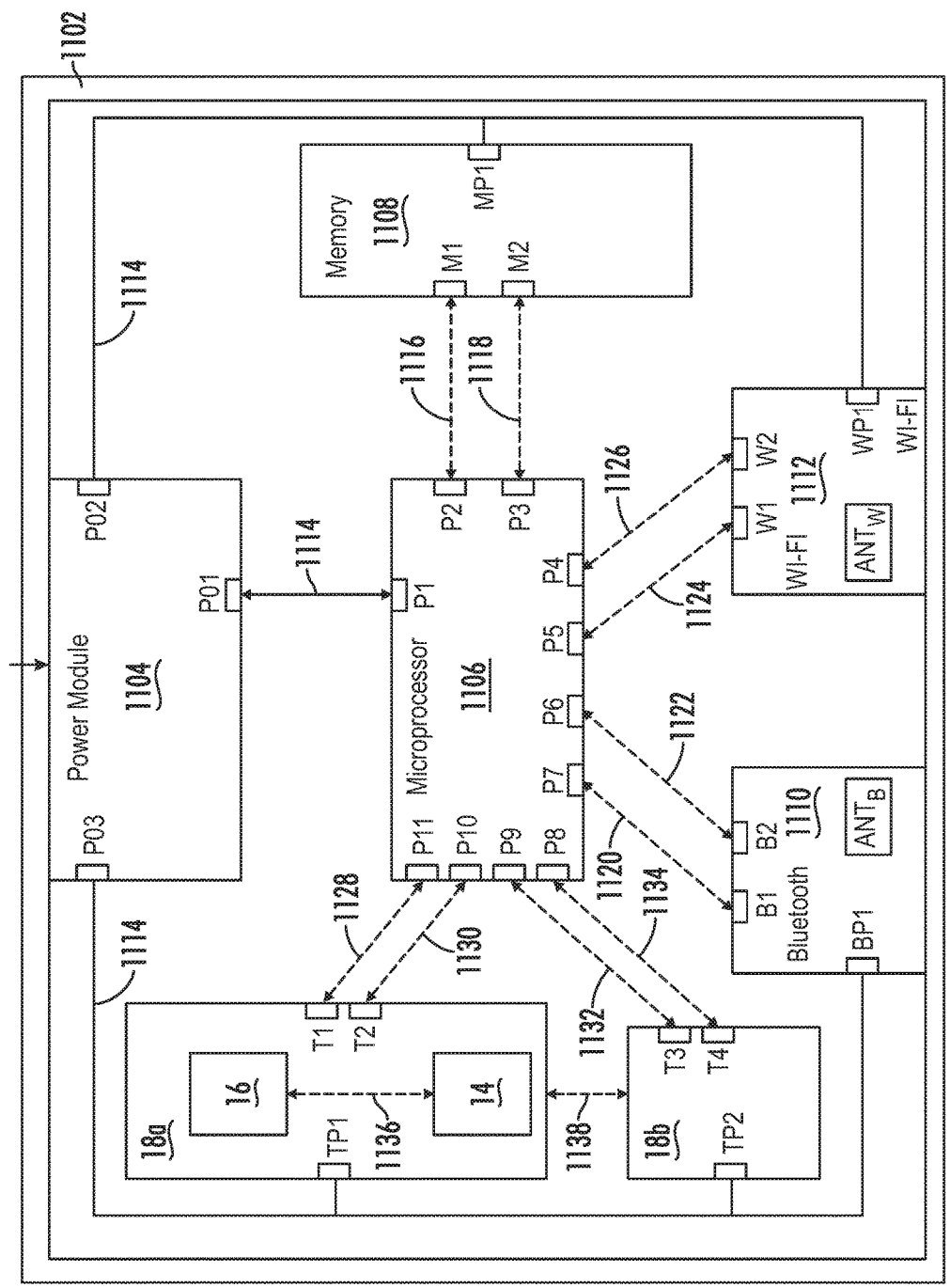
FIG. 11 is a block diagram illustrating an exemplary embodiment of an internal configuration of a transducer box according to the present disclosure.

FIG. 11 is a block diagram illustrating an internal configuration of a transducer box 660 according to an exemplary embodiment. The transducer box 660 includes one or more of a housing 1102, a power module 1104, a microprocessor 1106, a memory 1108, a Bluetooth module 1110, a Wi-Fi module 1112, and one or more sound detection modules 18. In the embodiment illustrated by FIG. 11, there are two sound detection modules, 18a and 18b. One or more of the sound detection modules 18 may include at least one of a sound detection device 14 and/or a transducer 16. For example, the sound detection module 18a includes both of a sound detection device 14 and a transducer 16. The housing 1102 may be configured to store, hold, and/or enclose one or more components. The housing 1102 may be selected or implemented according to one or more material properties of the housing 1102. For example, in one embodiment the housing 1102 is made from a material configured to reduce, enhance, or otherwise modify at least one of sound and vibration characteristics.

One or more of the components of the transducer box 660 may be connected to one another and/or the power module 1104 via at least one conductive bus 1114 connected to power output pins PO1, PO2, and PO3. Although illustrated as separate pins, it should be appreciated that two or more of the power output pins may be implemented as a single, combined power pin without departing from the spirit and the scope of the present disclosure. The power module 1104 may be configured to receive input power and to provide operating power to at least one component of the transducer box 660. The power module 1104 may include, for example, an AC-DC power converter, a DC-DC power converter, a connection to an external or internal power source such as a battery or capacitor, or any other means of connection to or implementation of a power source. In one exemplary embodiment, the transducer box 660 is configured to connect to a standard AC power input source via the power module 1104. Additionally or alternatively, a power source such as a disposable or rechargeable battery may be included as a part of the power module 1104 and may be used to power the transducer box 660 as a main power source, as a back-up power source, or as a combination thereof.

The transducer box 660 may include a microprocessor 1106. In one exemplary embodiment, the microprocessor 1106 may be a Microchip dspic33fj256gp710 processor. The microprocessor 1106 may be powered by the power module 1104 (e.g., at an input pin P1 coupled to the conductive bus 1114) and may be connected to a memory 1108 via a memory input pin P2 via bus 1116 and a memory output pin P3 via 1118. The memory 1108 may be connected to the bus 1116 at an output pin M1 and may be connected to the bus 1118 at an input pin M2. The memory may powered by the power module 1104 via the conductive bus 1114 at the memory power input pin MP1. The microprocessor 1106 may be configured to execute one or more instructions to cause the transducer box 660 to perform one or more operations in the manner described herein. In various embodiments, the microprocessor 1106 may be configured to execute instructions stored in the memory 1108 and/or operate upon one or more sets of data stored in the memory 1108. At least a portion of data operated upon by the microprocessor 1106 may be received from at least one of the sound detection modules 18a and 18b. For example, in one exemplary embodiment, at least a portion of the one or more sets of data stored in the memory 1108 corresponds to data either received from or otherwise associated with at least one of a sound detection device 14, a transducer 16, and/or a sound detection module 18.

The microprocessor 1106 may be connected to a Bluetooth module 1110. In one exemplary embodiment, the Bluetooth module 1110 may be a WT32 Bluetooth module from Silicon Labs. The Bluetooth module 1110 may be connected to the conductive bus 1114 via a Bluetooth module power input pin BP1. The Bluetooth module 1110 may include at least one of Bluetooth module output pin B1 coupled to a microprocessor Bluetooth input pin P7 via the bus 1120 and a Bluetooth module input pin B2 coupled to a microprocessor Bluetooth output pin P6 via the bus 1122. The Bluetooth module 1110 may further include an antenna $ANT_B$ configured to perform at least one of sending and receiving wireless signaling associated with the Bluetooth protocol. Although described with reference to the Bluetooth protocol, it should be appreciated that the Bluetooth module 1110 may be configured to operate with one or more additional or alternate wired or wireless protocols, so long as at least one communications signal is transmitted or received in association with the Bluetooth module 1110.

The microprocessor 1106 may be connected to a Wi-Fi module 1112. In one exemplary embodiment, the Wi-Fi module 1112 may be a WF 121 Wi-Fi module from Silicon Labs. The Wi-Fi module 1112 may be connected to the conductive bus 1114 via a Wi-Fi module power input pin WP1. The Wi-Fi module 1112 may include at least one of Wi-Fi module output pin W2 coupled to a microprocessor Wi-Fi input pin P4 via the bus 1126 and a Wi-Fi module input pin W1 coupled to a microprocessor Wi-Fi output pin P5 via the bus 1124. The Wi-Fi module 1112 may further include an antenna $ANT_W$ configured to perform at least one of sending and receiving wireless signaling associated with one or more wireless communication protocols. It should be appreciated that the Wi-Fi module 1112 may be configured to operate with one or more additional or alternate wired or wireless protocols, so long as at least one communications signal is transmitted or received in association with the Wi-Fi module 1112.

The sound detection module 18a may be coupled to the conductive bus 1114 via a sound detection module power input pin TP1. The sound detection module 18a may be further connected to the microprocessor 1106 via one or more of buses 1128 and 1130. For example, a sound detection module output pin T1 may be coupled to a microprocessor input pin P11 via bus 1128 and a sound detection module input pin T2 may be coupled to a microprocessor output pin P10 via bus 1130. The sound detection device 14 and transducer 16 may be coupled to one another via a bus 1136. The bus 1136 may further be connected to one or more of sound detection module output pin T1, sound detection module input pin T2, and sound detection module power input pin TP1. The sound detection module 18a may be connected to a sound detection module 18b, for example via a bus 1138.

The sound detection module 18b may be coupled to the conductive bus 1114 via a sound detection module power input pin TP2. The sound detection module 18b may be further connected to the microprocessor 1106 via one or more of buses 1132 and 1134. For example, a sound detection module output pin T4 may be coupled to a microprocessor input pin P8 via bus 1134 and a sound detection module input pin T3 may be coupled to a microprocessor output pin P9 via bus 1132.

Although described with reference to one or more pins, it should be appreciated that each of the pins described may be implemented by one or more pins, and that the operations of a plurality of pins may be implemented by a single pin in various embodiments. Furthermore, although described with reference to being internal to a transducer 660, it should be appreciated that one or more components of the transducer 660 may be located either internally or externally to the transducer 660. For example, in one exemplary embodiment, at least a portion of data associated with the memory 1108 may be stored remotely to the transducer 660, and may be accessed via one or more wired or wireless communications means associated with the transducer 660. For example, in one exemplary embodiment, at least a portion of the memory 1108 may be implemented as a distributed storage network and/or cloud-computing environment.

Figure 12:
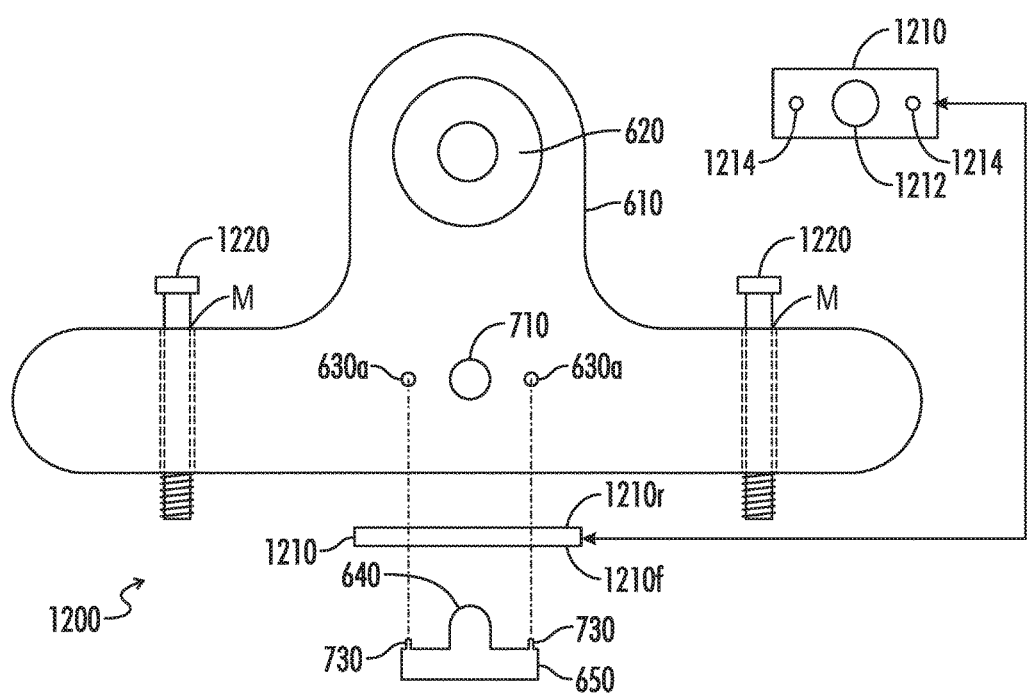
FIG. 12 illustrates an exploded view of an exemplary embodiment of a transducer box and housing according to aspects the present disclosure.

FIG. 12 illustrates an exploded view of an exemplary embodiment of a transducer box and housing according to aspects the present disclosure. The system 1200 includes a housing 610 and a transducer box 650. The housing 610 optionally includes a mounted bearing 620 and one or more mounting positions M. In one exemplary embodiment, the housing 610 is a pillow block housing included as part of an electromechanical device 12. The one or more mounting positions M may be configured to couple the housing 610 to a surface, such as a surface of at least one component of the electromechanical device 12. One or more mounting positions M may be a screw hole, a through hole, a position indicator, or any other opening or indicia associated with coupling the housing 610 to a surface or object. One or more fasteners 1220 may be associated with the one or more mounting positions M (e.g., as a screw or other fastening or connecting device). The housing 610 may further include at least one cavity 710 and one or more cavities 630a, optionally configured as a housing contact point and/or mounting location.

The system 1200 may include at least one bracket 1210. The bracket 1210 may be used as a spacer between the housing 610 and the transducer box 650 in one exemplary embodiment. The bracket 1210 may include a through hole 1212 and one or more mounting holes 1214. Each of the through hole 1212 and one or more mounting holes 1214 may be configured to receive at least a portion of the transducer box 650 and may permit the transducer box 650 to operate in the manner described herein. For example, in one embodiment, the through hole 1212 may be configured such that at least a portion of the dampening tube 640 may be received within the through hole 1210 (e.g., and further into at least a portion of the cavity 710). Further, one or more cavities 630a may be configured to receive at least a portion of at least one anchor 730. The bracket 1210 may include a front face 1210f and/or a rear face 1210r. The front face 1210f may be configured to contact a surface of the transducer box 650. The rear face 1210r may be configured to contact a surface of the housing 610. In one exemplary embodiment, the bracket 1210 may be configured to be sandwiched between opposing surfaces of the housing 610 and the transducer box 650.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication or exchange between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISPs), and intermediate communication interfaces.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for equipment sound monitoring, the system comprising:
    an electromechanical device having at least one cavity defined therein;
    a dampening tube configured such that at least a portion of the dampening tube is received within the at least one cavity without contacting a surface of the electromechanical device; and
    a transducer box including an opening defined therein, the opening configured to receive at least a portion of the dampening tube,
    a sound detection module configured to detect at least one of audio and vibration associated with the electromechanical device received via the dampening tube.

2. The system of claim 1, wherein the electromechanical device is a pillow block housing.

3. The system of claim 1, wherein the system further comprises a server connected to the transducer box via a communications network, and wherein the transducer box further includes a communications interface coupled to the communications network, the transducer box being configured to transmit one or more sets of data from the sound detection module to the server via the communications network.

4. The system of claim 3, wherein the server is configured to:
    receive the one or more sets of data;
    determine baseline criteria according to one or more of an electromechanical device type, location, and sound data, wherein one or more comparative models of baseline data are associated with at least one status of operation of the electromechanical device;
    compare the received one or more sets of data with the baseline data;
    identify variations between the one or more sets of data and the baseline data associated with failure or substandard operation of the electromechanical device; and
    generate an alert configured to notify a user of the failure or substandard operation of the electromechanical device.

5. The system of claim 1, wherein the communications network is a Bluetooth communications network.

6. The system of claim 1, wherein the communications network is a local area network (LAN) communications network.

7. The system of claim 1, wherein the communications network is the Internet.

8. The system of claim 1, further comprising at least one anchor coupled between the electromechanical device and the transducer box.

9. The system of claim 8, wherein the at least one anchor comprises a plurality of anchors coupled between the electromechanical device and the transducer box, the plurality of anchors configured to mount at least one transducer box to the electromechanical device.

10. The system of claim 1, wherein the at least one cavity extends into the electromechanical device at least one inch.

11. A method for providing equipment sound monitoring for an electromechanical device, the method comprising:
    creating a cavity within a housing of the electromechanical device;
    inserting at least a portion of a dampening tube into the cavity without causing contact between the dampening tube and the housing;
    anchoring a transducer box to the housing;
    placing at least a portion of the dampening tube into the transducer box; and
    measuring analog sound signals of associated with the electromechanical device by one or more transducers of the transducer box.

12. The method of claim 11, wherein the creating a cavity comprises drilling a hole in the housing of the electromechanical device.

13. The method of claim 11, wherein the creating a cavity comprises forming the cavity in the housing during manufacture of the housing.

14. The method of claim 11, further comprising:
converting the collected sound signals into digital sound data;
transmitting one or more data files comprising location data, electromechanical device type data, and the digital sound data to a server via a communications network;
determining baseline criteria according to one or more of the electromechanical device type, location data, and sound data, one or more comparative models of baseline data associated with at least one status of operation of the electromechanical device;
comparing the received digital sound data with the baseline data;
identifying variations between the collected digital sound data and the baseline data associated with failure or substandard operation of the electromechanical device; and
generating an alert configured to notify a user of the failure or substandard operation of the electromechanical device.

15. The method of claim 14, wherein the communications network is a Bluetooth communications network.

16. The method of claim 14, wherein the communications network is a local area network (LAN) communications network.

17. The method of claim 14, wherein the communications network is the Internet.

18. The method of claim 11, further comprising anchoring the transducer box to the housing via one or more anchors.

19. The method of claim 18, wherein the anchoring comprises anchoring a plurality of anchors between the electromechanical device and the transducer box, thereby mounting the transducer box to the electromechanical device.

20. The method of claim 11, wherein the creating the cavity within the housing and the inserting the at least a portion of the dampening tube into the cavity creates an air gap within the housing, and wherein sound associated with the electromechanical device passes through the dampening tube to the transducer box perpendicular to at least one transducer of the transducer box.

* * * * *